United States Patent [19]

Bennett

[11] 4,009,418

[45] Feb. 22, 1977

[54] ATTACHMENT OF HEAT PIPES TO ELECTRICAL APPARATUS

[75] Inventor: Ronald E. Bennett, Conover, N.C.

[73] Assignee: General Electric Company

[22] Filed: Mar. 20, 1975

[21] Appl. No.: 560,127

[52] U.S. Cl. .................................. 361/38; 165/105; 336/58

[51] Int. Cl.$^2$ .......................................... H02H 7/04

[58] Field of Search ................. 317/15, 14 F, 14 H; 336/61, 58; 165/105, 104, 106, 76, 78, 80; 310/64; 174/15 R, 15 BH, 15 HP; 62/DIG. 12

[56] References Cited

UNITED STATES PATENTS

| | | | |
|---|---|---|---|
| 3,541,487 | 11/1970 | Leonard | 165/105 X |
| 3,627,899 | 12/1971 | Moore | 165/105 X |
| 3,668,070 | 6/1972 | Fiebelmann | 165/105 X |
| 3,735,175 | 5/1973 | Blomgren, Jr. | 165/105 X |
| 3,792,318 | 2/1974 | Fries et al. | 165/105 X |
| 3,823,769 | 7/1974 | Anderson et al. | 165/105 X |
| 3,828,849 | 8/1974 | Corman et al. | 165/105 |
| 3,831,664 | 8/1974 | Pogson | 165/80 |

*Primary Examiner*—J D Miller
*Assistant Examiner*—Patrick R. Salce
*Attorney, Agent, or Firm*—Francis X. Doyle

[57] ABSTRACT

An electrical apparatus, such as a distribution transformer, provided with heat pipes for cooling. The apparatus is provided with attachment wells, either extending into the cooling fluid of the apparatus or secured along the outside wall of the apparatus. Heat pipes are provided which fit into the attachment wells, with the evaporator section of the heat pipe mounted in the wells. The condenser section of the heat pipe extends away from the apparatus. Thermally conductive grease is placed in the wells to minimize the temperature drop from the wells to the evaporator section of the heat pipe.

4 Claims, 5 Drawing Figures

ATTACHMENT OF HEAT PIPES TO ELECTRICAL APPARATUS

BACKGROUND OF THE INVENTION

This invention relates to electrical apparatus provided with heat pipe cooling means, and more particularly, to electrical apparatus provided with wells to removably secure heat pipes to the electrical apparatus.

It is well-known to those skilled in the art that electrical apparatus, such as distribution transformers and the like, generate considerable heat during operation. It is also well-known that it is necessary to dissipate this heat to prevent the destruction of the electrical apparatus. Normally, the heat is dissipated by air cooling. For example, by pole or pad mounting of the electrical apparatus. When such apparatus is placed below ground, normally vaults are utilized. Grills are provided over the vaults in order to circulate cooling air into vaults and about the electrical apparatus. In all such instances, the size of the container or enclosure for electrical apparatus must provide sufficient area in contact with the air to provide adequate cooling.

When the electrical apparatus is directly buried in the ground, the cooling depends solely on the conduction of the heat from the enclosure of the electrical apparatus through the surrounding soil and to the atmosphere above. In general, cooling by this means is less efficient, thus, larger tanks or enclosures have been required for buried transformers when compared to the enclosures of electrical apparatus of the same rating cooled by air. For buried transformers, since the heat must be conducted through the soil to the atmosphere, the top of the enclosure is the closest surface to the soil-atmosphere interface and thus would be the most efficient heat transfer surface. However, the air space within the transformer enclosure greatly restricts the heat transfer from this surface.

Recently, it has been suggested that buried tanks should be substantially elongated to provide greater surface area in contact with the ground or soil; where the tank is positioned in a substantially constant moisture area. See U.S. Pat. No. 3,443,157. The elongation of the tank is said to improve movement of the insulating fluid and provide better contact between the moving insulating fluid and the entire outer wall of the tank, thus, improving heat conduction. However, the elongated transformer tank depends entirely on the heat conduction between the tank wall and the ground. Thus, the cooling of such device will be dependent on the total surface area of the tank which is in contact with the ground.

It has recently been discovered that more efficient cooling of electrical apparatus can be obtained through the use of heat pipes. Using the heat pipe particularly as a portion of the enclosure of the electrical apparatus will provide greater cooling while not being as dependent on the overall surface area of the electrical apparatus enclosure. Such a transformer is disclosed in application Ser. No. 544,037, filed Jan. 27, 1975, for Electrical Apparatus With Heat Pipe Cooling, in the names of Paul L. Waldon and Ronald E. Bennett, the inventor herein, and assigned to the same assignee as this invention.

While the above application provides one solution to the cooling of transformers, especially buried transformers, it does require that the heat pipe be constructed as a portion of the transformer enclosure. This to some extent minimizes the efficiency of the heat pipe. In order to provide for more efficient heat pipes for cooling of electrical apparatus, it has been found desirable to provide a means for removably attaching heat pipes to electrical apparatus, particularly buried distribution transformers. This would enable a more efficient heat pipe construction since the heat pipes could be shipped separately from the apparatus and attached to the apparatus at the site where the apparatus is to be installed; for example, buried. This will, of course, provide ease in the shipping, handling and storage of both the apparatus and the heat pipe for the manufacturer as well as the customer. Of course, it will also provide for the use of more efficiently constructed heat pipes.

It is, therefore, a principal object of this invention to provide for the removable attachment of heat pipes to electrical apparatus.

A further object of this invention is to provide wells in electrical apparatus which will receive heat pipes to provide improved cooling of such electrical apparatus.

SUMMARY OF THE INVENTION

In carrying out this invention in one form, an electrical apparatus is provided with attachment wells forming a part of the apparatus enclosure. The wells are designed to provide for the removable attachment of heat pipes to the electrical apparatus, the wells receiving the evaporator section of the heat pipe. In one embodiment, the wells extend into the cooling fluid of the apparatus, while in another embodiment, the wells are secured to the outer wall of the enclosure. Thermally conductive grease is placed in the wells to improve the thermal conductivity between the wells and the evaporator section of the heat pipes.

The invention which is sought to be protected will be particularly pointed out and distinctly claimed in the claims appended hereto. However, it is believed that this invention, and the manner in which its various objects and advantages are obtained, as well as other objects and advantages thereof, will be better understood by reference to the following detailed description of preferred embodiments, particularly when considered with the accompanying drawing.

DESCRIPTION OF PREFERRED EMBODIMENTS

This invention relates to electrical apparatus being cooled with heat pipes. More particularly, the invention is concerned with the manner of removable attachment of the heat pipes to enable the use of efficient heat pipes for cooling of the electrical apparatus while enabling the ease of storage and shipment of both the electrical apparatus and the heat pipes.

Heat pipes are well-known to those skilled in the cooling art and have been extensively described in the literature. Generally, the heat pipe is in the form of a hollow geometric enclosure having a wick and a working fluid. Typically, one portion of the heat pipe is the evaporator section wherein heat acts on the working fluid to evaporate such fluid. Another section of the heat pipe is the condenser section and the evaporated working fluid flows to the condenser section where it condenses to a liquid. Normally, the liquid returns through the wick to the evaporator portion of the heat pipe. An excellent description of heat pipes and various designs used in cooling electronic devices may be found in Electronics of Dec. 12, 1974, pages 114–117. Insofar as necessary to further describe the function of a heat pipe, such description is included by reference herein. In some uses of heat pipes, it has been found that a wick as such is unnecessary. Where the heat pipe is in a substantially vertical position with the evaporator section at the lower end and the condenser section at the upper end; wicking is normally not required. This heat pipe in effect becomes a thermal syphon. In these devices, as will be understood, the working fluid becomes vaporized at the evaporator end and condenses back to a liquid at the condenser end. The condensed liquid flows by gravity back to the evaporator end.

In one preferred embodiment of this invention, attachment wells are provided extending into the cooling fluid of the electrical apparatus. An alternate form of the preferred embodiment provides for attachment wells which are secured to the outer wall of the apparatus enclosure. In both embodiments, the wells are designed to receive the evaporator section of a heat pipe allowing the condenser section of the heat pipe to extend away from the apparatus enclosure.

Figure 1:
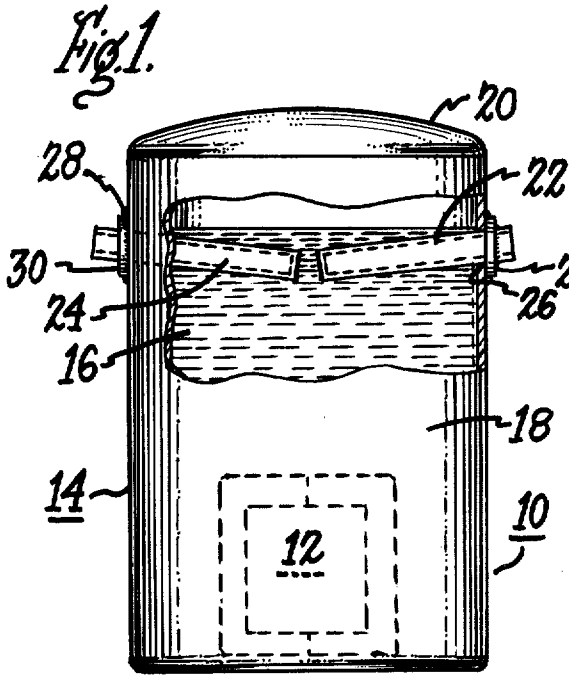
FIG. 1 is an elevational view partly in section, of one form of attachment wells for an electrical apparatus according to one of the preferred embodiments of this invention.

Referring now to the drawing wherein like numerals are used to indicate like parts, FIG. 1 shows one form of an electrical apparatus utilizing one of the preferred embodiments of this invention. As is shown in FIG. 1, an electrical apparatus 10 is in the form of a transformer having a core and coil unit 12 mounted within an enclosure 14. The core and coil unit 12 is immersed in a fluid dielectric 16 such as, for example, mineral oil. The enclosure 14 shown in FIG. 1 is in the form of a round tank 18 having a cover 20. As will be understood, high and low voltage bushings (not shown) are normally mounted on the cover 20 or the tank 18 providing a high voltage lead into the core and coil unit 12 and a low voltage distribution from the core and coil unit 12 to a load, such as a residential load. As above described, apparatus 10 is a conventional distribution transformer.

Figure 3:
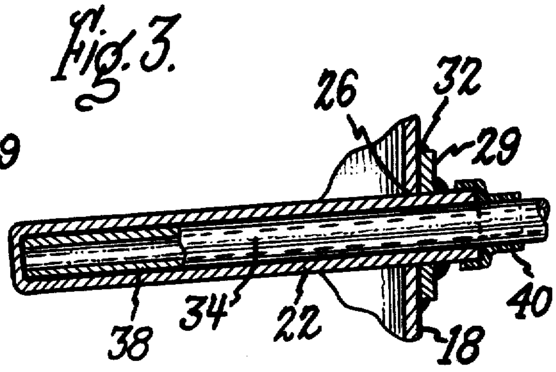
FIG. 3 is an enlarged sectional view of a portion of the apparatus of FIG. 2, showing one form of the attachment of the heat pipe in greater detail.

In order to improve the cooling of the transformer 10, heat pipes are provided. In the embodiment shown in FIGS. 1 through 3, attachment wells are provided in the form of substantially tubular members 22, 24 extending through openings 26, 28 in the wall of tank 18. The tubular shaped wells 22, 24 extend into the cooling fluid 16 of the transformer 10. As is best shown in FIG. 3, the wells 22, 24 are provided with a flange 29,30; the flange being welded to the tank of 18, as indicated at 32. Obviously, wells 22 and 24 could be secured to tank 18 by clamping, or other means, if desired. Heat pipes 34, 36 are provided, having an outside diameter slightly less than the inside diameter of the wells 22, 24. In the usual form of the invention caps would be placed over the outside of wells 22, 24, such caps being removed prior to the installation of heat pipes 34, 36. Before placing heat pipes 34, 36 in the wells 22, 24, a quantity of high thermally conductive grease is placed in the well, as is indicated at 38 in FIG. 3. As will be understood, grease 38 will improve the thermal conductivity between the wells 22, 24 and the heat pipes 34, 36. It will be clear to those skilled in the art that the evaporator section of the heat pipes 34, 36 will be inserted into wells 22, 24 while the condenser section will extend away from the transformer 10. For example, the condenser section may extend into the ground area surrounding transformer 10 when it is buried, such as indicated in FIG. 2.

Figure 2:
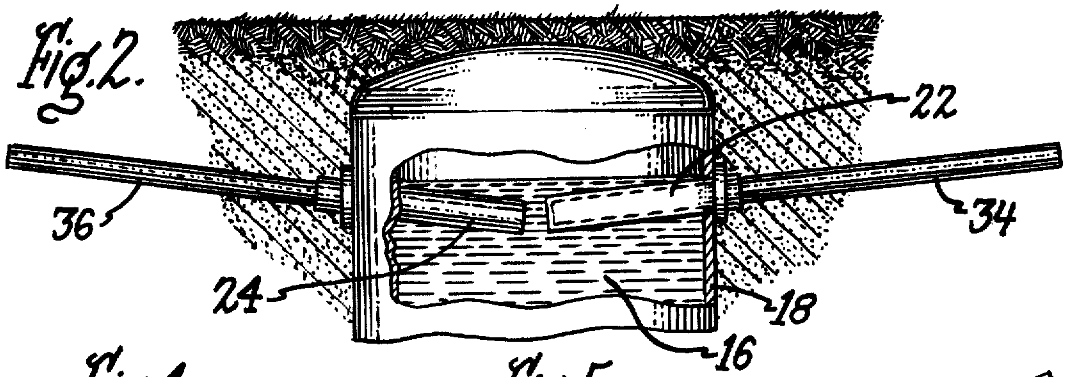
FIG. 2 is a partial sectional view, similar to FIG. 1, showing the heat pipes attached, and the apparatus buried.

As can be seen in FIGS. 1 and 2, the attachment wells extend into the transformer 10, below the level of the fluid dielectric 16. This will provide better heat transfer from the cooling fluid 16 to the evaporator sections of the heat pipes 34, 36. In order to prevent moisture from entering the wells 22, 24, a seal may be provided, such as the heat shrinkable sleeve 40, shown in FIG. 3. While two heat pipe wells 22, 24 and two heat pipes 34, 36 are shown, it will be understood that as many or as few heat pipes will be provided as is necessary to obtain the required cooling for the electrical apparatus.

Figure 4:
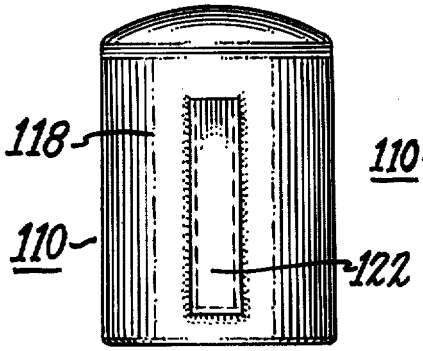
FIG. 4 is an elevational view of an alternate form of the preferred embodiment of heat pipe connections.
Figure 5:
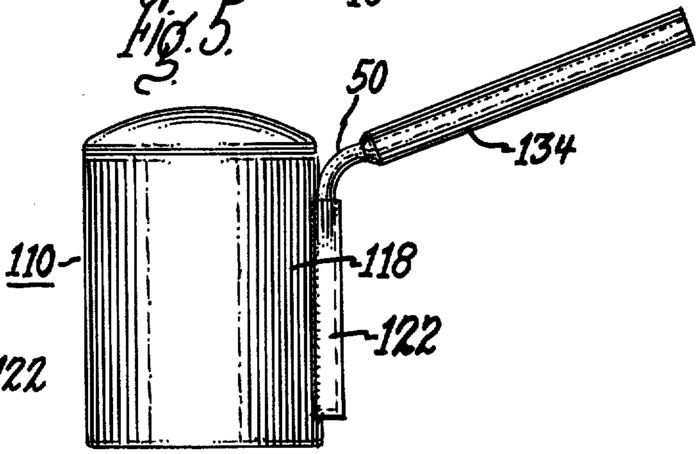
FIG. 5 is a view similar to FIG. 4 showing the heat pipe attached to the apparatus.

FIGS. 4 and 5 show a second embodiment in which the electrical apparatus 110 is provided with an attachment well 122. The attachment well 122 is secured to the outside wall 118 of the apparatus 110, in any desired manner, such as by welding. In this embodiment, it is preferred to have the substantially tubular well 122 of a semirectangular shape following the contour of the tank wall 118. Of course, the evaporator section of the heat pipe 134 will be similarly shaped so as to readily fit within the attachment well 122. As will be understood, a high thermally conductive grease will be placed into the attachment well 122 prior to assemblying the heat pipe 134. In the embodiment shown in FIG. 5, the heat pipe 134 is provided with a bent section 50 between the evaporator section in the attachment well 122 and the condenser section of heat pipe 134.

As will be apparent from the above description by providing attachment wells for electrical apparatus it is possible to assemble heat pipes with the electrical apparatus at the particular site where the apparatus should be installed. This will enable much easier handling and storage of both the apparatus and the heat pipe prior to installation while yet providing for efficient heat pipe cooling of the electrical apparatus.

While there has been shown and described the present preferred embodiment of this invention it will be understood that various modifications may be made. Obviously, the attachment wells may be made of any desired geometrical shape. It is only necessary that the heat pipe be of the same geometrical design as the attachment wells to provide good thermal conductivity between the wells and the evaporator section of the heat pipe.

It will be apparent to those skilled in the art that all such modifications as may be made are included herein to the extent they are within the spirit and scope of the invention defined in the appended claims.

What is claimed as new and which it is desired to secure by Letters Patent of the United States is:

1. An electrical apparatus including an enclosure with a heat generating unit mounted therein and immersed in a dielectric fluid;

at least one attachment well secured to said enclosure, a heat pipe mounted in said attachment well the evaporator section of said heat pipe extending into said attachment well and a condenser section extending away from said enclosure.

2. An electrical apparatus including an enclosure with a heat generating unit mounted therein and immersed in a dielectric fluid;

heat pipe attachment means secured to said enclosure; said heat pipe attachment means being in the form of attachment wells, said attachment wells being in the form of substantially tubular sections closed at one end, said tubular sections being formed of substantially the same shape as associated heat pipes so as to accept therein the evaporator section of a heat pipe.

3. An electrical apparatus as set forth in claim 2, in which the attachment well extends through the wall of said enclosure below the level of the dielectric fluid in the enclosure.

4. An electrical apparatus as set forth in claim 2, in which said attachment well is secured to the exterior wall of the enclosure.

* * * * *